J. E. BARNETT.
DIRECTION INDICATOR FOR VEHICLES.
APPLICATION FILED DEC. 12, 1918.
1,364,679.
Patented Jan. 4, 1921.
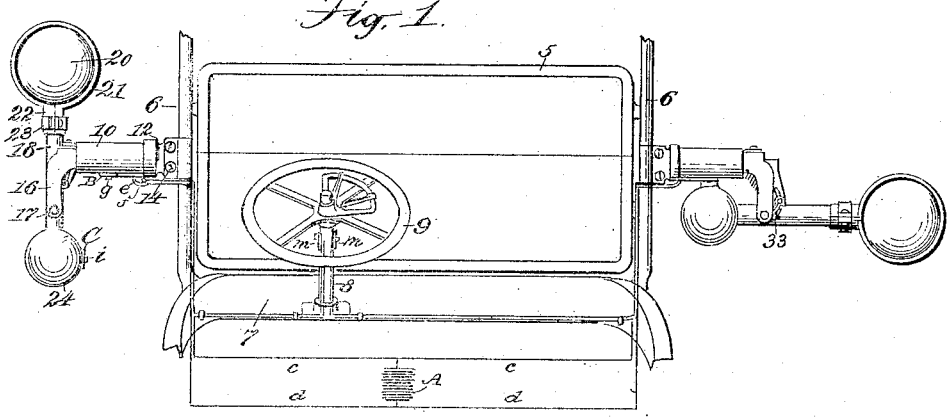
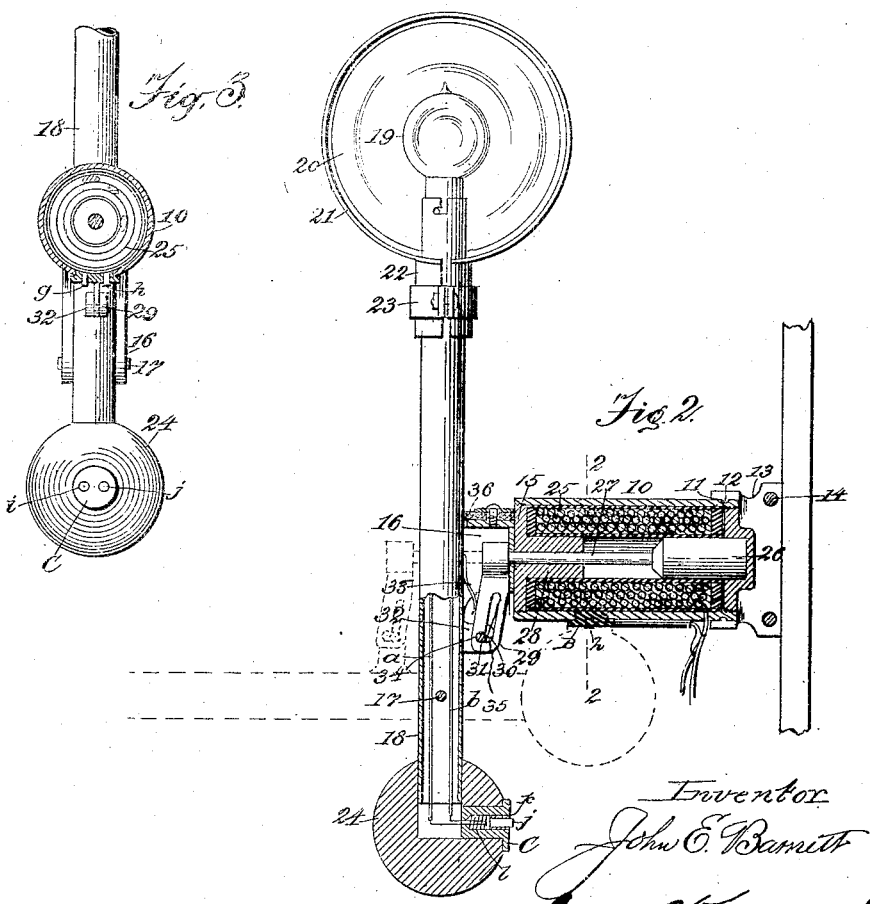
Inventor
John E. Barnett
Geo. P. Kimmel
Atty.

UNITED STATES PATENT OFFICE.

JOHN E. BARNETT, OF CEDAR RAPIDS, IOWA.

DIRECTION-INDICATOR FOR VEHICLES.

1,364,679.  Specification of Letters Patent.  Patented Jan. 4, 1921.

Application filed December 12, 1918. Serial No. 266,425.

*To all whom it may concern:*

Be it known that I, JOHN E. BARNETT, a citizen of the United States, residing at Cedar Rapids, in the county of Linn and State of Iowa, have invented certain new and useful Improvements in Direction-Indicators for Vehicles, of which the following is a specification.

This invention relates to the operating of vehicles, more particularly of the motor-driven type, the principal object of the invention being to provide simple and easily operated means for indicating the direction about to be taken by such vehicle.

Another and equally important object of the invention is to provide a signal of the character mentioned employing a novel form of operating means therefor, whereby the same can, at the desire of a user, be moved from its normal or non-signaling position to an operative or signaling position for indicating the direction in which the vehicle provided therewith is about to travel, means for illuminating the signal subsequent to operation of the operating means being provided and controlled upon movement of the signal from is normal or non-signaling position to its operative or signaling position, thus rendering the same clearly visible in darkness.

Other objects will be in part obvious and in part pointed out hereinafter.

The nature of the invention is fully disclosed in the description and claim following, reference being had to the accompanying drawings, in which:—

Figure 1 is an elevation of a device embodying my invention, as seen from the driver's seat, Fig. 2 is an enlarged view of the same, partly in section in a central vertical plane, and Fig. 3 is a fragmentary view of the same as shown in Fig. 2, to the left of the line 2—2.

In the drawing, the numeral 5 denotes the wind-shield of an automobile; 6, the supports therefor; 7, the cowl at the front of the body; 8, the steering post, and 9, the steering wheel. These are of familiar construction, and need no particular description. My improved signaling device is herein shown attached to the windshield supports, and is described as follows:

A tubular casing or shell 10 is grooved at 11 to receive the internal lugs 12 of a pair of clamps 13, formed semi-circular at one end to fit the shell, and at the other end recessed to fit over the edges of the said support upon which they are clamped by suitable screws 14. This serves to hold the shell in place and also permits of its being turned axially in the clamp, which in different automobiles will be inclined more or less from the vertical by reason of the arrangement of the windshield thereon. In the outer end of the shell is secured as by screw-threads, a head 15, and to this head is attached a depending bracket 16, between the forked ends of which is hung on pivots 17, a tubular arm 18 which is normally maintained upright, as shown at the left in Fig. 1 but which may drop to signaling position, as shown at the right of the same figure. The upper and outer end of the arm is provided with a small electric lamp 19, taking current from conductors *a b*. Outside the lamp is a shade 20 which should be colored red or green, held in a ring 21 clamped by its split tubular shank 22 to the arm by a clip 23. The shade may be of glass or other transparent or translucent material, such for example as celluloid. At the other end of the arm is attached a weight 24 heavy enough to swing the arm to its vertical position and to normally maintain it in such position. It is forced to the horizontal position magnetically by mechanism best shown in Fig. 2. Inside the shell is arranged a winding 25, provided with a central sliding solenoid core 26. When the winding is energized this core pushes outwardly a plunger 27 sliding in the hub 28 of the outer head. To the outer end of the plunger is attached a depending arm 29, slotted at 30 to receive a pin 31 passing through lugs 32 attached to the main semaphore arm 18. The push of the solenoid core carries the pin through about 90 degrees of arc, bringing the semaphore to the horizontal, as will be evident. When the solenoid winding is deënergized, the semaphore assumes the vertical position by gravity. This may be assisted, however, by a light spring 33, connecting at one end with the semaphore, and at the other with its supporting bracket, as shown in Fig. 1. The arm is locked in its vertical position by a recess 34 formed in the arm 29 at one end of the slot 30, the cross pin being forced into the recess at the terminal position by a light spring 35. Any tendency of the semaphore arm to vibrate and chatter when in normal position is counteracted by a cushioning seat of rubber or the like, 36 secured at the upper end of the bracket 16.

Electric current both for the solenoid and the lamp is supplied from any suitable source, as a battery A. Conductors $c$ $d$ lead to the solenoid winding. From these short conductors $e$ $f$ lead to terminals $g$ $h$ set in an insulating plug B. These terminals contact with coinciding terminals $i$ $j$ seated in a similar plug C set in the weight 24 and these connect with the conductors $a$ $b$ respectively. In practice, the terminals are mounted slidably in tubes $k$ and are pressed outwardly by springs $l$ so as to give good electrical contact when the arm is thrown to horizontal position.

In one side of the circuit provided by the conductors $c$ $d$ is a switch $m$ which is placed at some point easily accessible to the driver of the vehicle, as on the steering post, as shown in Fig. 1. One of these is provided for each signaling device, but both may operate from a single electric generator.

It of course will be understood that a pair of the improved signals are used in connection with a vehicle, one being arranged on each side of the same to indicate the turns or movements to be made by the same either to the left or to the right. Further, these signals can be located at any desired point on the vehicle whereat they will be displayed to the best advantage, such as conditions or preference may dictate.

The operation of the device is very simple. When the intention is to turn to the left, the operator touches the left hand switch. The push of the solenoid first unlocks the semaphore arm, and then throws it over to signaling position, where it remains as long as current flows in the solenoid coil. When the semaphore reaches its final position, the lamp lights automatically by contact of the terminals. When the current is broken the arm swings by gravity automatically to normal position. The operator is thus relieved of the necessity of throwing out an arm to right or left, which is often inconvenient, and is of little practical use after dark.

Manifestly, the construction shown is capable of considerable modification, and such modification as is within the scope of my claim, I consider within the spirit of my invention.

Having thus described my invention, I claim:

A direction indicator for vehicles comprising a laterally extending cylindrical shell, a clamp for attaching said shell to a vehicle, said shell and clamp being provided with inter-engaging means permitting rotatable adjustment of the shell about its axis, a supporting bracket at the opposite end of the shell, a semaphore arm pivoted in said bracket with signaling means on one end of said arm, means normally holding it in upright position, a solenoid in said shell, a plunger operated by the solenoid and connected with the semaphore arm to operate the signal to signaling position.

In testimony whereof, I affix my signature hereto.

JOHN E. BARNETT.